United States Patent
Ganwani et al.

(10) Patent No.: US 7,941,194 B2
(45) Date of Patent: May 10, 2011

(54) ANTENNA CO-LOCATION IN PORTABLE DEVICES FOR SIMULTANEOUS RECEIVE AND TRANSMIT

(75) Inventors: Nisha Ganwani, Austin, TX (US); Greg Allan Hodgson, Austin, TX (US); Russell Croman, Austin, TX (US); Jonathan D. Pearce, London (GB); Wade R. Gillham, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 642 days.

(21) Appl. No.: 11/985,640

(22) Filed: Nov. 16, 2007

(65) Prior Publication Data

US 2009/0130992 A1    May 21, 2009

(51) Int. Cl.
*H04M 1/00*    (2006.01)
*H04B 1/02*    (2006.01)

(52) U.S. Cl. ......... 455/575.7; 455/95; 455/97; 455/129; 455/121; 455/269; 455/562.1; 455/569.1; 455/569.2; 455/11.1; 455/23; 455/25

(58) Field of Classification Search ............... 455/575.7, 455/95, 97, 129, 121, 193.1, 269, 562.1, 455/569.1, 569.2, 11.1, 23, 25
See application file for complete search history.

(56) References Cited

U.S. PATENT DOCUMENTS

| | | | |
|---|---|---|---|
| 4,475,246 A * | 10/1984 | Batlivala et al. | 455/18 |
| 5,886,650 A | 3/1999 | Komatsu et al. | 340/988 |
| 5,923,292 A | 7/1999 | Dodd | 342/383 |
| 7,218,684 B2 | 5/2007 | Bolourchi et al. | 375/304 |
| 7,245,939 B2 | 7/2007 | Goldberg | 455/562.1 |
| 2005/0111566 A1 | 5/2005 | Park et al. | 375/267 |
| 2006/0094385 A1 | 5/2006 | Rafati | 455/272 |
| 2007/0038373 A1 | 2/2007 | Chen | 701/213 |
| 2007/0042709 A1 * | 2/2007 | Krieger et al. | 455/3.02 |
| 2007/0232239 A1 | 10/2007 | Der et al. | 455/73 |
| 2007/0238421 A1 | 10/2007 | Rafi et al. | 455/110 |
| 2007/0247360 A1 | 10/2007 | Hsu | 342/357.09 |
| 2007/0259649 A1 * | 11/2007 | Felder | 455/412.1 |
| 2008/0090515 A1 * | 4/2008 | Wu | 455/3.06 |
| 2008/0159364 A1 * | 7/2008 | Rofougaran | 375/219 |
| 2008/0233954 A1 * | 9/2008 | Ibrahim et al. | 455/434 |

OTHER PUBLICATIONS

TomTom, "*Perfectly engineered; New TomTom GO, the ultimate car navigator,*" 34841 Milan_Brochure UK-EN.indd 1; Jun. 20, 2007.

* cited by examiner

*Primary Examiner* — Wen W Huang
(74) *Attorney, Agent, or Firm* — O'Keefe, Egan, Peterman & Enders, LLP

(57) ABSTRACT

Systems and methods are disclosed for the co-location of radio frequency (RF) antennas in portable devices, portable devices and their docking stations and related systems, and devices with restrictive space constraints to allow for simultaneous receive (RX) and transmit (TX) operation without degradation. The systems and methods disclosed overcome RX channel degradation, receiver performance, and other problems seen in prior solutions. More particularly, transmit and receive antennas are oriented to provide for cross-polarization of their electro-magnetic fields, are oriented to allow one or both antenna to fall within null regions of the other antenna, and/or oriented with both cross-polarization and null region considerations in mind. Other variations and implementations are also described.

25 Claims, 6 Drawing Sheets

ANTENNA CO-LOCATION IN PORTABLE DEVICES FOR SIMULTANEOUS RECEIVE AND TRANSMIT

TECHNICAL FIELD OF THE INVENTION

This invention relates to radio frequency communications and, more particularly, to radio frequency receive and transmit operations in portable devices, portable devices and their docking stations and related systems, and devices with restrictive space constraints.

BACKGROUND

Devices and related systems exist that provide radio frequency (RF) receive (RX) functionality and RF transmit (TX) functionality within the same frequency band(s), within receive bands in which harmonics of the transmit may occur, or within closely spaced bands in the frequency spectrum. Such prior systems have used a transmit antenna and a receive antenna that are physically separate. In such devices, however, the transmit and receive functionality are not operated at the same time because when the receive circuitry and the transmit circuitry and their associated antennas are co-located within a single device or a device and its related systems, interference from the transmitter will cause degradation in the receiver performance. In other words, signals transmitted by the transmit circuitry over the transmit antenna tend to inject unwanted signals into the receive antenna and thus the receive circuitry, causing a degradation in receiver performance. For example, some portable devices and related systems have an FM transmitter and an FM receiver, use an electrically small stub antenna for the FM transmitter, and a larger antenna for the FM receiver, such as a ½ wavelength antenna in the form of a headphone wire. As stated however, such systems typically use some rudimentary method to reduce or avoid interference such as bi-modal or half-duplex approach to receive and transmit, never transmitting when attempting to receive and vice versa.

Existing devices with both RX/TX functionality and RX/TX antennas have attempted to address the interference from these simultaneous RX/TX operations in a number of ways. First, some devices operate in half-duplex or bi-modal mode, turning off the transmitter circuitry when the receiver circuitry is running and vice versa. One disadvantage of this option is that the receiver and transmitter cannot operate simultaneously, limiting the usefulness of the functionality. Second, some devices separate the transmit circuitry and antenna a large distance from the receive circuitry and antenna so that the two functions can operate simultaneously and without degradation. One disadvantage of this second option is that device/system size is increased considerably to provide a distance that is adequate to ameliorate or eliminate the degradation in performance. In addition, this second option is not practical for many portable devices, such as portable navigation devices (PNDs), handsets, and portable media players (PMPs), because the size requirements for these portable devices are too constrained to allow for adequate spacing between the receive circuitry, the transmit circuitry and their respective antennas. Third, some devices partition the frequency band to allow the transmit function to generate transmit frequencies only in channels that are far removed from the receive function and its channels. This option severely limits the number of channels in which the transmit and receive functions can operate. Finally, some devices use complicated filtering to prevent the transmit signals from affecting the receive channels. This filtering solution requires a large and costly bill of materials (BOM) and causes parts of the receive band to become unusable for transmit functions, or some parts of the receive band unusable for receive functions. This final filtering solution is thus typically costly and complicated. In short, each of these prior solutions suffers from significant disadvantages.

SUMMARY OF THE INVENTION

Systems and methods are disclosed for the co-location of radio frequency (RF) antennas in portable devices, portable devices and their docking stations and related systems, and devices with restrictive space constraints to allow for simultaneous receive (RX) and TX (TX) operation without degradation. The systems and methods disclosed overcome RX channel degradation, receiver performance, and other problems seen in prior solutions. More particularly, with respect to an FM band implementation, the degradation in the FM receive channel quality caused by an FM transmitter operating simultaneously within a close distance or within the same device/system is greatly reduced or even eliminated. Thus, the disclosed systems and methods allow for co-existence of RX and TX operations within a single portable device/system, such as a portable navigation devices (PNDs), handsets, portable media players (PMPs), and other systems related to these devices. As described below, other features and variations can be implemented, if desired, and related systems and methods can be utilized as well.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

Figure 1A:
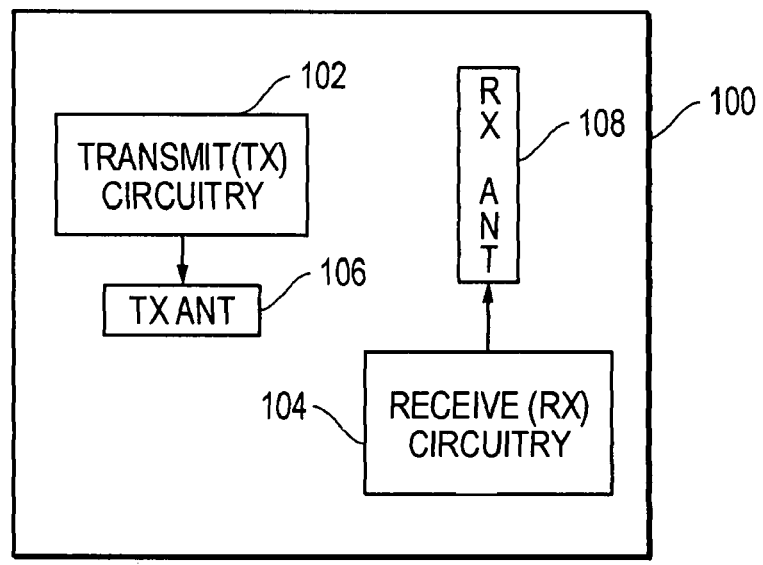
FIG. 1A is a block diagram for a device having receive circuitry, transmit circuitry, a receive antenna and a separate transmit antenna.

Systems and methods are disclosed for co-locating receive (RX) and transmit (TX) antennas in portable devices and related systems to allow for simultaneous RX and TX operations. To reduce the impact of and/or prevent nearby transmit signals from affecting the receive channels for the receiver, it is desirable for the transmit power to be attenuated at the receiving system, RX antenna, and/or receiving circuitry. The systems and methods described herein achieve high levels of such signal attenuation by aligning the TX antenna and the RX antenna so that one or both of the antennas fall within the null of the other, are cross-polarized with respect to each other, or both, thereby reducing or even eliminating the interference from the transmitter circuitry/antenna to the receiver circuitry/antenna.

As described herein, electrically small antennas are used for both the RX antenna and the TX antenna. These electrically small antennas are placed in a selected geometry within the device or device module so as to achieve reduced interference that helps to allow the receiver and transmitter to work simultaneously in the vicinity of each without significant performance degradation. As used herein, electrically small refers to an antenna that is 1/10 or smaller in size, and preferably 1/20 or smaller in size, as compared to the wavelength of the frequencies intended to be received and/or transmitted. With respect to the stub antennas described below, the length of the stub antenna is 1/10 or smaller than the wavelength of frequencies being received and/or transmitted. With respect to the loop antennas described below, the circumference of the loop antenna is 1/10 or smaller than the wavelength of frequencies being received and/or transmitted. Other antenna configurations could also be used, as desired, with the effective length of the antenna still being selected so as to provide an electrically small antenna. For example, various configurations and shapes (e.g., serpentine, L-shaped) of trace antennas laid out on a circuit board or semiconductor integrated circuit could be utilized. As described below, other features and variations can be implemented, if desired, and related systems and methods can be utilized as well.

As also described herein, the co-located TX and RX antennas are placed in close proximity to each other. For the embodiments contemplated herein, this close proximity refers to the receive and TX antennas being co-located with respect to each other within about one wavelength of the frequencies being received and/or transmitted. For FM band, therefore, the RX and TX antennas would be located within about 3 meters of each other. With respect to handheld, portable, or small devices and their related systems, the co-located antennas are preferably placed within about 1/10 or less of a wavelength due to typical device size limitations. For FM band, the TX and RX antennas would be placed within about 10-30 cm or less of each other and, more preferably, within 10-15 cm or less of each other. While the antenna configurations and location techniques are useful for a wide variety of environments, they are particularly useful for RX and TX antennas co-located in close proximity and used for simultaneous RX and TX operations with respect to handheld, portable, or small devices and their related systems.

It is also important to note that while much of the discussion below is directed to audio broadcast channels in the FM band, FM audio broadcast signals are only one example application for the antenna co-location techniques described herein. More generally, these techniques are applicable to coexistence and simultaneous operation of RX circuitry and TX circuitry within a common frequency band, such as the FM band, whether or not frequency modulated signals are being utilized. As such, the receivers and transmitters discussed herein can be understood as receivers and transmitters operating within a common frequency band, and FM band receivers and FM band transmitters are example embodiments. Further, one application for these FM band receivers and FM band transmitters is with respect to FM audio broadcast channels and signals.

As discussed and used herein, the FM band relates to the frequency band utilized for FM audio broadcasts. Within the United States and Europe, as well as most of the rest of the world, FM radio stations are broadcast in the frequency band from about 87.5 MHz to about 108.0 MHz. A 200 KHz channel spacing is used in the United States, while a 100 KHz channel spacing is used in Europe. In Japan, the FM band for FM audio broadcasts is from about 76 MHz to about 90 MHz. These and other common broadcast bands, such as weather band and short wave radio bands, are described, for example, in U.S. Pat. No. 7,272,375 entitled "INTEGRATED LOW-IF TERRESTRIAL AUDIO BROADCAST RECEIVER AND ASSOCIATED METHOD," which is commonly-owned by the Assignee of this Application, and which is hereby incorporated by reference in its entirety. The techniques described herein are equally applicable to simultaneous transmit and receive operations within one of these broadcast bands, within two or more of these broadcast bands, and/or some other frequency range where TX and RX frequencies are relatively close together.

FIG. 1A is a block diagram for a device 100 having receive (RX) circuitry 104, transmit (TX) circuitry 102, an electrically small RX antenna 108 and an electrically small TX antenna 106. As described further herein, the antennas 106 and 108 are located in fixed positions, and these positions are selected so that the nulls for one or both of the antennas are positioned to overlap the other antenna, or the antenna fields are cross-polarized, or both, to allow the receiver and transmitter to work simultaneously in the vicinity of each without significant performance degradation.

Figure 1B:
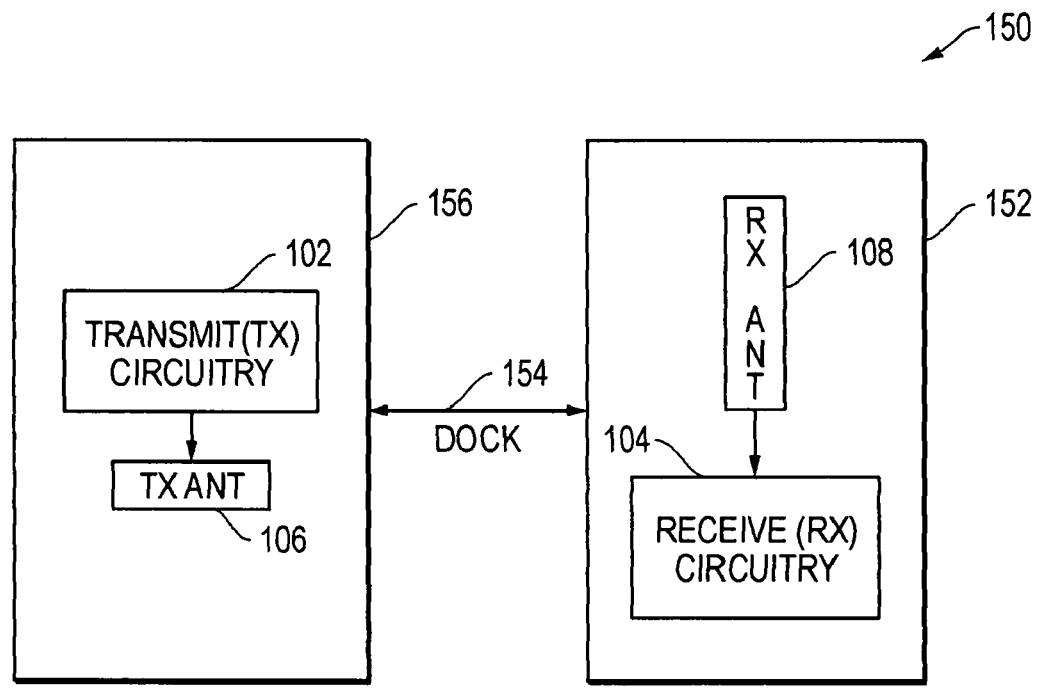
FIG. 1B is a block diagram for a device system having first module with receive circuitry and a receive antenna and a second module with transmit circuitry and a transmit antenna.

FIG. 1B is a block diagram for a system 150 having a first module 156 and a second module 152. In addition, if desired, the first module 156 and the second module 152 can dock together through dock connection 154. This docking can provide mechanical connections, electrical connections, or both, as desired. As depicted, first module 156 includes TX circuitry 102 and TX antenna 106. The second module 152 includes receive circuitry 104 and RX antenna 108. As with embodiment 100 of FIG. 1A, the antennas 106 and 108 are electrically small antennas and are located in a fixed relationship with each other when the modules are docked so that the nulls for one or both of the antennas are positioned to overlap the other antenna, or the antenna fields are cross-polarized, or both, to allow the receiver and transmitter to work simultaneously in the vicinity of each without significant performance degradation.

It is noted that example receive path circuitry for terrestrial broadcasts, including FM radio broadcasts, are described in U.S. Pat. No. 7,272,375 entitled "INTEGRATED LOW-IF TERRESTRIAL AUDIO BROADCAST RECEIVER AND ASSOCIATED METHOD," which is commonly-owned by the Assignee of this Application, and which is hereby incorporated by reference in its entirety. It is further noted that example transmit path circuitry, including FM band transmissions, are described in U.S. patent application Ser. No. 11/394,716, filed Mar. 31, 2006, and entitled "TRANSMITTER ARCHITECTURE," which is commonly-owned by the Assignee of this Application, and which is hereby incorporated by reference in its entirety. Still further, example transceiver circuitry, including FM band transceiver operations, are described in U.S. patent application Ser. No. 11/396,097, filed Mar. 31, 2006, and entitled "TRANSCEIVER HAVING MULTIPLE SIGNAL PROCESSING MODES OF OPERATION," which is commonly-owned by the Assignee of this Application, and which is hereby incorporated by reference in its entirety.

Figure 2A:
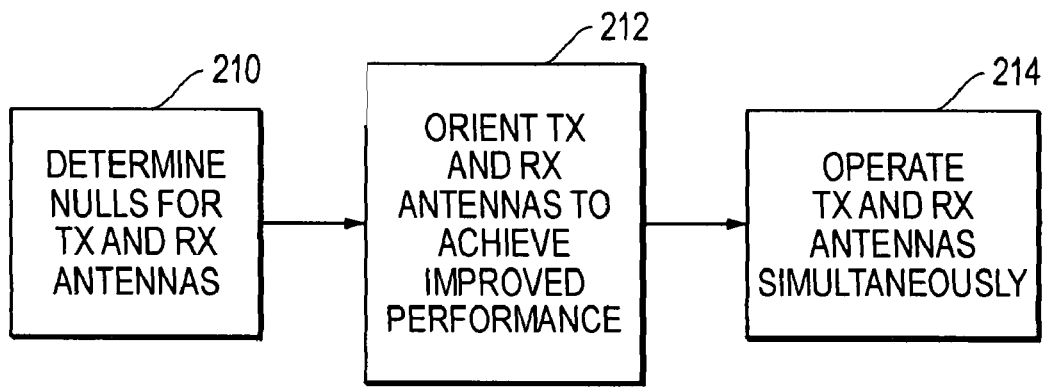
FIG. 2A is a flow diagram for determining nulls for receive and transmit antennas and then locating the antennas to achieve improved performance.

FIG. 2A is a flow diagram for determining the fixed orientation for the RX antenna and the TX antenna with respect to null alignment. In block 210, the nulls for the RX and/or TX antennas are determined. In block 212, the RX antenna and the TX antenna are oriented so that the nulls for one or both antennas overlap with the other antenna. And in block 214, the device is operated so that the RX circuitry and the TX circuitry, as well as their respective antennas, are operated simultaneously.

Figure 2B:
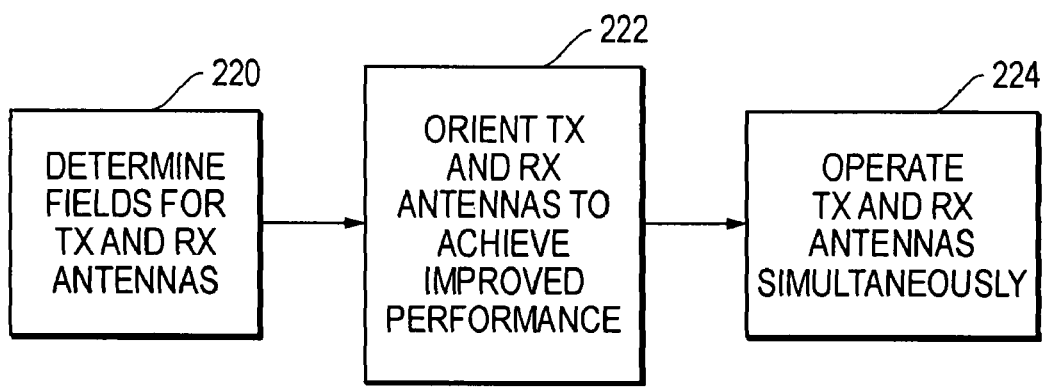
FIG. 2B is a flow diagram for determining fields for receive and transmit antennas and then locating the antennas to achieve improved performance.

FIG. 2B is a flow diagram for determining the fixed orientation for the RX antenna and the TX antenna with respect to cross-polarization of fields. In block 220, the electro-magnetic fields for the RX and/or TX antennas are determined. In block 222, the RX antenna and the TX antenna are oriented so that the fields for the antennas are cross-polarized with the fields for the other antenna. And in block 224, the device is operated so that the TX circuitry and the RX circuitry, as well as their respective antennas, are operated simultaneously.

Figure 3A:
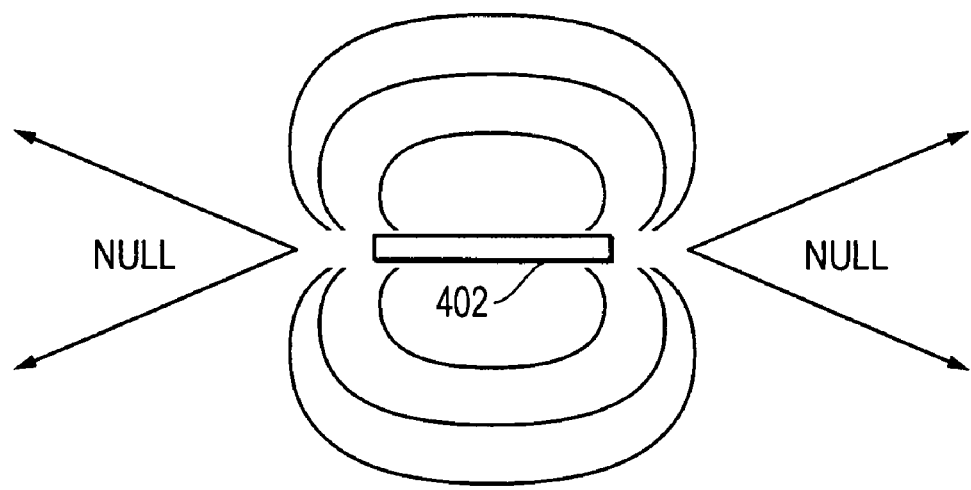
FIGS. 3A and 3B are diagrams representing radiation patterns typically present for a stub antenna and for a loop antenna, respectively.
Figure 3B:
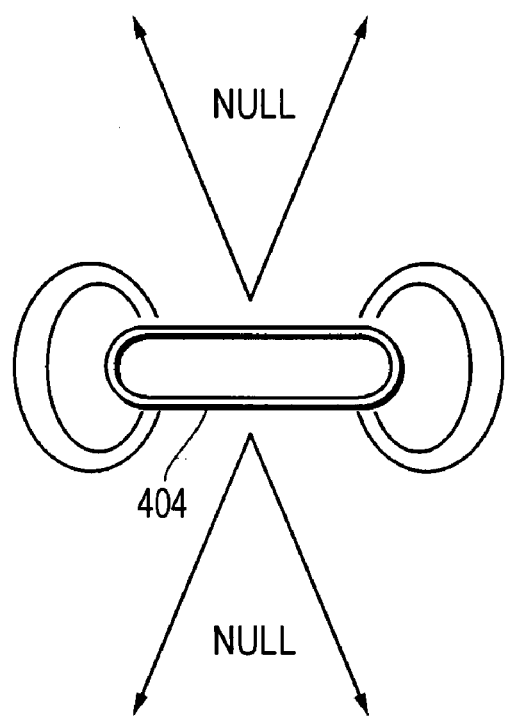

FIGS. 3A and 3B are diagrams representing the radiation patterns typically present for a stub antenna 402 and for a loop antenna 404 being used for transmit, respectively. During transmit operations, an alternating electrical current will be passed into the stub antenna 402 to cause it to radiate electromagnetic radiation at a desired frequency. Similarly, an electrical current will be passed through the loop antenna 404 to cause it to radiate electro-magnetic radiation at a desired frequency. Representative radiation patterns are depicted. With respect to the stub antenna 402, the null regions for these fields will be located in an angle extending from the ends of the stub antenna 402, as depicted in FIG. 3A. With respect to the loop antenna 404, the null regions for these fields will be located in an angle extending from the center of the loop perpendicular to the plane of the loop, as depicted in FIG. 3B. It is noted that the null sensitivity to transmitted fields for a stub antenna 402 and for a loop antenna 404 used for receive would be similar to the nulls depicted in FIGS. 3A and 3B.

If the RX antenna is placed within the null region for a TX stub antenna 402 or a TX loop antenna 404, the RX antenna will see less radiation from the TX antenna. As contemplated herein, where the RX antenna is also electrically small, it is possible to locate the RX antenna within these null regions. For larger antennas that are typically used in prior devices for receive operations, it is not possible to position the antenna within the null region unless is it placed at a considerable distance from the TX antenna.

Figure 3C:
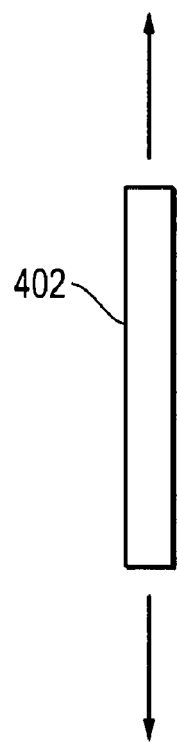
FIGS. 3C and 3D are diagrams representing a polarization reference direction for a stub antenna and for a loop antenna.
Figure 3D:
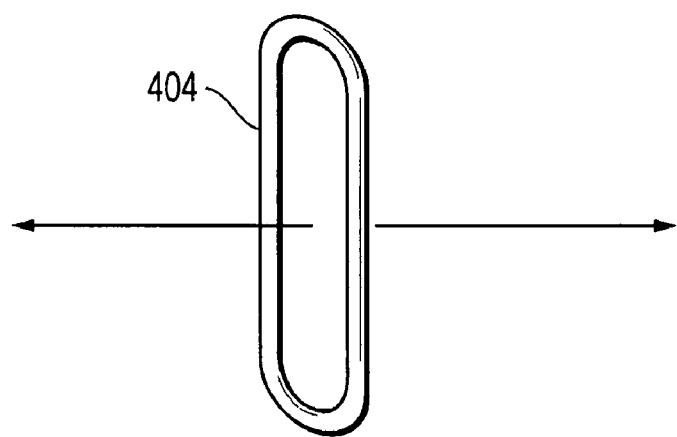

FIGS. 3C and 3D are diagrams representing polarization reference directions typically present for a stub antenna 402 and for a loop antenna 404 being used for transmit. As above, during transmit operations, an alternating electrical current will be passed into the stub antenna 402 to cause it to radiate electro-magnetic radiation at a desired frequency. Similarly, an electrical current will be passed through the loop antenna 404 to cause it to radiate electro-magnetic radiation at a desired frequency. With respect to the stub antenna 402, the polarization reference direction for this transmit radiation can be represented by a line passing through the middle of the stub antenna 402, as depicted in FIG. 3C. With respect to the loop antenna 404, the polarization reference direction for this transmit radiation can be represented by a line passing through the center of the loop perpendicular to the plane of the loop, as depicted in FIG. 3D. It is noted that the polarization sensitivity to transmitted fields for a stub antenna 402 and for a loop antenna 404 used for receive would be similar the polarization reference directions depicted in FIGS. 3C and 3D.

To cross-polarize stub and/or loop antennas, the polarization reference directions are made to lay in perpendicular planes to each other. If the RX antenna is placed so that its fields are cross-polarized with a TX stub antenna 402 or a TX loop antenna 404, the RX antenna will see less radiation from the TX antenna.

The use of electrically small antennas for both the RX antenna and the TX antenna allows the portable device to take advantage of null alignment and/or cross-polarization procedures. The relatively small antenna size allows for one or both of the antennas to be placed in the radiation nulls of the other antenna. And the relatively small antenna size allows for the fields of the antennas to be more easily cross-polarized at relatively small distances. As described above, electrically small refers to an antenna that is $\frac{1}{10}$ are smaller in size, and preferably $\frac{1}{20}$ or smaller in size, than the wavelength of the frequencies intended to be received and/or transmitted. With respect to the stub antennas described below, length of the stub antenna is $\frac{1}{10}$ or smaller than the wavelength of frequencies being received and/or transmitted. With respect to the loop antennas described below, the circumference of the loop antenna is $\frac{1}{10}$ or smaller than the wavelength of frequencies being received and/or transmitted. Other antenna configurations could also be used, as desired, with the effective length of the antenna still being selected so as to provide an electrically small antenna.

FIGS. 4A-D are block diagrams for stub antenna/loop antenna embodiments for electrically small RX and TX antennas. It is noted that for purposes of null determination, loop antennas can be treated as a stub antenna passing through the center of the loop perpendicular to the plane of the loop.

Figure 4A:
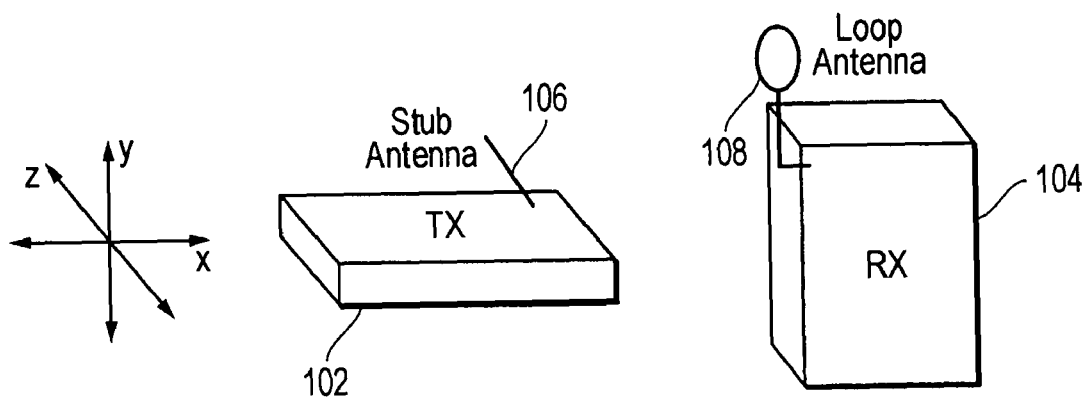
FIGS. 4A-D are block diagrams for stub antenna/loop antenna embodiments including a receive antenna and co-located transmit antenna.

FIG. 4A depicts the use of a stub antenna for TX antenna 106 and a loop antenna for the RX antenna 108. As depicted, the stub antenna 106 is extending out in Z-axis and can be 10 cm in length. The loop antenna 108 is laying in the XY-plane and can have a radius of 2.25 cm (i.e. circumference of about 14 cm) If the antennas 106 and 108 are positioned in this manner, a distance of about 16 cm between the antennas helps to ensure limited or no degradation in the RX performance due to the simultaneous TX operation. For this embodiment, the antennas have been configured for cross-polarization, taking into consideration their electro-magnetic fields.

Figure 4B:
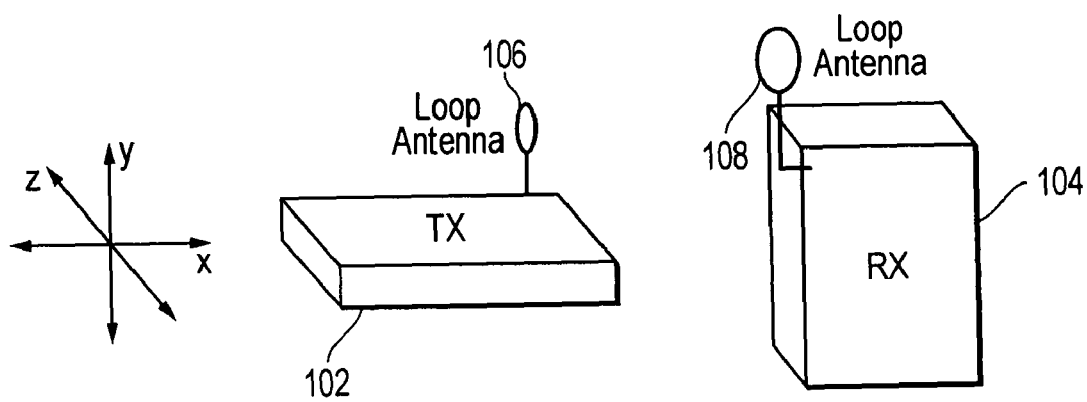

FIG. 4B depicts the use of a loop antenna for TX antenna 106 and a loop antenna for the RX antenna 108. As depicted, the loop antenna 106 is laying in the YZ-plane and can be about 14 cm in circumference (e.g., radius of 2.25 cm). The loop antenna 108 is laying in the XY-plane and can also be about 14 cm in circumference (e.g., radius of 2.25 cm). If both antennas are positioned in this manner, about 12.5 cm distance from center of the TX loop to the center of the RX loop helps to ensure limited or no degradation in the RX performance due to the simultaneous TX operation. For this embodiment, the antennas have been configured for cross-polarization, taking into consideration their electro-magnetic fields, and the RX antenna has been placed within the null region of the TX antenna. Hence both cross-polarization and null-alignment techniques have been utilized in this embodiment.

Figure 4C:
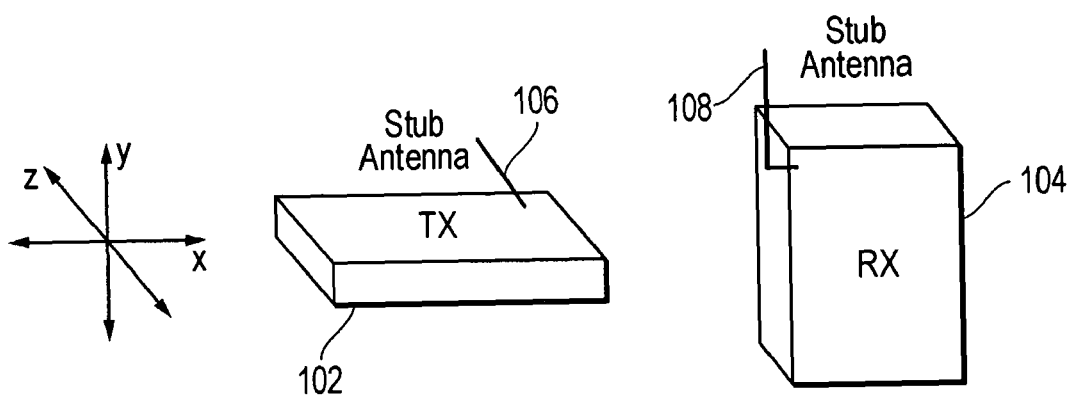

FIG. 4C depicts the use of a stub antenna for TX antenna 106 and a stub antenna for the RX antenna 108. As depicted, the stub antenna 106 is extending out in the Z-axis and can be 10 cm in length. The stub antenna 108 is in the Y axis and can be 10 cm in length. If both antennas are positioned in this manner, a distance of about 10 cm between the antennas helps to ensure limited or no degradation in RX performance due to the simultaneous TX operation. For this embodiment, the antennas have been configured for cross-polarization, taking into consideration their electro-magnetic fields.

Figure 4D:
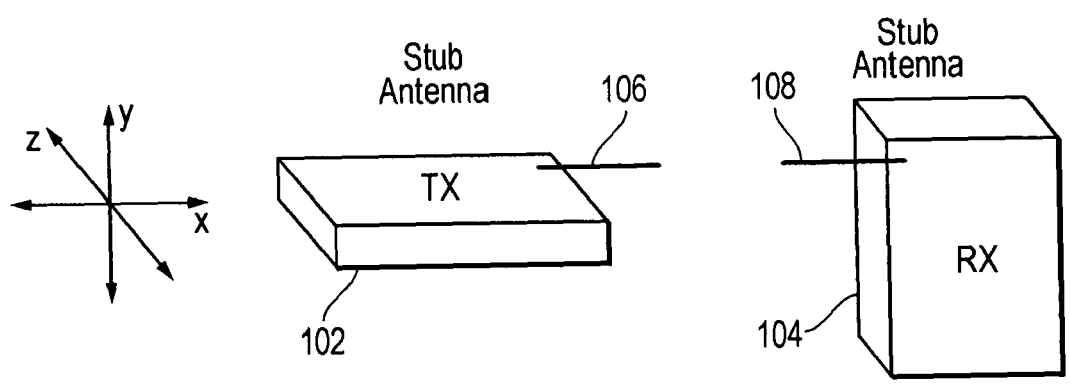

FIG. 4D depicts the use of a stub antenna for TX antenna 106 and a stub antenna for the RX antenna 108. As depicted, the stub antenna 106 is in the X axis and can be 10 cm in length. The stub antenna 108 is also in the X axis and can be 10 cm in length. If both antennas are positioned such that their ends are pointed at each other, a distance of about 2 cm between the ends of the antennas helps to ensure limited or no degradation in RX performance due to the simultaneous TX operation. For this embodiment, the antennas have been configured for null overlapping, taking into consideration the null areas of their fields.

It is noted that the above antenna solutions preferably use resonated antennas such that both the TX antenna and the RX antenna are resonated at the desired RX/TX frequencies. To resonate the antennas at different frequencies, a variable matching network can be utilized.

The use of electrically small antennas causes the antennas to be small enough to effectively fall within the minima or null of the other antenna. By identifying these nulls, the antennas can be positioned so that interference from the TX antenna to the RX antenna can be reduced or minimized. In addition, the electrically small antennas can be positioned so that their radiation is cross-polarized thereby reducing or minimizing the interference from the TX antenna to the RX antenna. As discussed above, the antennas can be positioned with consideration given only to nulls, only to cross-polarization, or both to nulls and cross-polarization. Using these techniques, the receiver performance can be improved during simultaneous operation of the transmitter.

It is noted that other considerations and techniques could be also be used, as desired, in locating the antennas. It is noted further that the need for simultaneous transmit and receive in the same frequency band is not a common requirement for many devices or portable devices. Although the systems and methods described herein are applicable to a wide range of devices, portable devices and related systems in which simultaneous transmit and receive operations are desired, the systems and methods described herein are particularly useful for such devices in which transmit and receive is occurring within in the same frequency band.

One such application is for portable navigation devices (PNDs). A PND is typically a device that uses digital maps and a GPS (global position system) receiver to provide navigation aids. In addition, for PNDs, it is desirable to both transmit within the FM audio broadcast band and receive within the FM audio broadcast band. The FM transmit operation is used, for example, to send voice direction information to an FM audio broadcast receiver within a vehicle stereo system so that a driver can hear driving directions determined by the PND. The FM transmit operation can also be used to send audio information, such as music from compressed digital audio files, to an FM receiver. For example, the PND can be used as a portable music player that can send the music or other audio information for reception by a vehicle's stereo system. The FM receive operation is used, for example, to receive terrestrial FM broadcasts of traffic information, such as traffic message channel (TMC) broadcasts. This traffic information can be used by the PND to route or reroute a driver around particular driving hazards or traffic hazards. The GPS receiver within the PND is typically used to determine the location of the PND with respect to one or more digital maps. And the GPS receiver will typically include a GPS antenna coupled to GPS receive circuitry to receive and process signals from a plurality of GPS satellites. It is noted that TMC information is often provided as traffic information in Radio Data System (RDS) information broadcast along with an FM broadcast channel. Currently, traffic information broadcasts are provided, for example, by navigation device and map companies such as Tele Atlas, which is based in The Netherlands.

The FM receive operation may also used, for example, to gather quantitative information about the FM band such as signal quality of various channels. As a further example, the FM receive operation may also be used to gather additional RDS information such as Open Data Application (ODA) information. Because each of these additional operations are preferably performed constantly and/or consistently, while the transmitter may or may not be operational, it is important for the FM receive operation to function without degradation while the FM transmit function is simultaneously transmitting.

Due to degradation in receiver performance with the simultaneous operation of a transmitter within the same FM band, PNDs have not before been implemented to have simultaneous operation of FM transmit and receive. For example, in a PND device or system having an FM transmitter and FM tuner, the FM tuner performance can degrade significantly due to the simultaneous operation of the FM transmitter because of the close proximity of the two antennas. In particular, when the FM tuner is tuned to an off-air broadcast channel and the FM transmitter were to be turned on for transmission on a given FM channel, the tuner will experience significant degradation in performance. This degradation can be caused, for example, by an automatic gain control (AGC) circuit with the FM receive path engaging to keep the a low noise amplifier (LNA) input from saturating. The PND environment is one in which a relatively weak FM signal is being received (TMC broadcast) while a relatively strong signal is being transmitted (FM band transmit) in close proximity where there is a relatively small separation between the receive frequency and the transmit frequency (e.g., both within FM band).

Using the null alignment and/or the cross-polarization techniques described herein, the FM tuner can be operated at the same time as the FM transmitter without experiencing significant degradation. This simultaneous operation allows the PND to receive TMC broadcasts while also transmitting audio information through the FM transmitter. In a vehicle implementation, this simultaneous operation allows a user to listen to digital audio files stored on the PND through the FM receiver of the vehicle while the PND is also receiving TMC broadcasts. The PND can also be configured to interrupt the digital audio file playback with audible navigation prompts to the user. As described above, the PND can be implemented as a single device with both an FM transmit antenna and an FM receive antenna. The PND can also be implemented as a two module system having a docking module and a portable module. The docking module can be attached to a car window and can receive the portable module when the user is driving the car. If desired, the docking module can be configured to have the FM receive antenna, and the portable module can be configured to have the FM transmit antenna.

As described above, the antenna configurations described herein can be used with PND devices and modular systems to provide simultaneous TMC broadcast reception and FM transmit. The antenna configurations described herein can also be used for simultaneous transmit and receive operations for other applications and in other devices and frequency bands, as desired. For example, receiving weather band (WB) broadcasts with a receive antenna while also transmitting FM band signals with a transmit antenna would also be a effective solution utilizing the techniques described herein. More generally, the techniques described herein are useful where a transmit and receive system function simultaneously in close proximity to each other and where the frequencies of one system are within about three times (3×) the frequencies of the other system.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A system having co-located antennas for simultaneous receive and transmit operations, comprising:
    a first module, comprising
        transmit circuitry configured to transmit signals within a first frequency range, the first frequency range being within an FM band for FM audio broadcasts; and
        a transmit antenna coupled to the transmit circuitry, the transmit antenna being electrically small such that it is 1/10 or smaller in size as compared with frequencies within the first frequency range; and
    a second module, comprising:
        receive circuitry configured to receive signals within a second frequency range and to operate simultaneously with the transmit circuitry, the frequencies within the second frequency being within about three-times (3×) the frequencies within the first frequency range; and
        a receive antenna coupled to the receive circuitry and positioned within close proximity to the transmit antenna such that it is within about one wavelength of the frequencies within the first frequency range, the receive antenna being electrically small such that it is one-tenth (1/10) or smaller in size as compared with frequencies within the second frequency range;
    wherein the receive antenna is oriented with respect to the transmit antenna so that nulls of one or both of the antennas overlap the other antenna;
    wherein electromagnetic fields of the antennas are cross-polarized; and
    wherein the first and second modules are configured to be detachably connected to each other in a docking arrangement, such that the transmit antenna and the receive antenna are located in a fixed relationship when the first and second modules are docked.

2. The system of claim 1, wherein the transmit circuitry and transmit antenna are configured to transmit audio information.

3. The system of claim 2, wherein the audio information comprises audio information from one or more digital audio files.

4. The system of claim 1, wherein the receive circuitry and receive antenna are configured to receive traffic information.

5. The system of claim 4, wherein the transmit circuitry and transmit antenna are configured to transmit audio information, and wherein the audio information comprises audio traffic prompts.

6. The system of claim 5, further comprising global positioning system (GPS) receive circuitry and a GPS antenna, the GPS receive circuitry and GPS antenna being utilized to provide position information relative to one or more digital maps.

7. The system of claim 1, wherein the second frequency range is also within the FM band for FM audio broadcasts.

8. The system of claim 7, wherein the transmit circuitry and the transmit antenna are configured to transmit on one or more FM broadcast channels within the FM band, the FM broadcast channels being capable of being received by an FM receiver, and wherein the receive circuitry and the receive antenna are configured to receive information on one or more traffic message channels (TMCs) within the FM band.

9. The system of claim 1, wherein the receive circuitry and the receive antenna are configured to receive radio data system (RDS) information.

10. The system of claim 1, wherein the receive circuitry and the receive antenna are configured to receive one or more weather band (WB) channels.

11. The system of claim 1, wherein the transmit antenna is one-twentieth (1/20) or smaller in size as compared with frequencies within the first frequency range, or the receive antenna is one-twentieth (1/20) or smaller in size as compared with frequencies within the second frequency range, or both, and wherein the receive antenna is positioned within close proximity to the transmit antenna such that it is within about one-tenth (1/10) wavelength of the frequencies within the first frequency range.

12. The system of claim 1, wherein the transmit antenna comprises a stub antenna or a loop antenna, and wherein the receive antenna comprises a stub antenna or a loop antenna.

13. The system of claim 1, wherein the receive antenna and the transmit antenna comprise resonated antennas.

14. The system of claim 1, wherein the first module is configured to transmit audio information and wherein the second module is configured to receive traffic information.

15. A method for simultaneous receiving and transmitting signals on co-located antennas, comprising:
    providing a first module having a transmit antenna that is electrically small such that it is 1/10 or smaller in size as compared with frequencies within a first frequency range to be received using the transmit antenna, the first frequency range being within an FM band for FM audio broadcasts;
    providing a second module having a receive antenna that is electrically small such that it is 1/10 or smaller in size as compared with frequencies within a second frequency range to be received using the transmit antenna, the frequencies within the second frequency being within about three-times (3×) the frequencies within the first frequency range;
    docking the first and second modules together so that they are detachably connected to each other in a docking arrangement and so that the transmit antenna and the receive antenna are located in a fixed relationship with the receive antenna being positioned within close proximity to the transmit antenna such that it is within about one wavelength of frequencies within the first frequency range and with the receive antenna being oriented with respect to the transmit antenna so that nulls of one or both of the antennas overlap the other antenna and so that electromagnetic fields of the antennas are cross-polarized;
    transmitting signals within the first frequency range using the transmit antenna; and
    simultaneously receiving signals within the second frequency range using the receive antenna.

16. The method of claim 15, wherein the transmitting step comprises transmitting audio information from one or more digital audio files.

17. The method of claim 15, wherein the receiving step comprises receiving traffic information on or more traffic message channels (TMCs).

18. The method of claim 17, further comprising receiving position information from one or more global positioning system (GPS) satellites using GPS receive circuitry and a GPS antenna, and wherein the transmitting step comprises transmitting audio information comprising audio traffic prompts.

19. The method of claim 15, wherein the simultaneously receiving step comprises simultaneously receiving signals within the FM band for FM audio broadcasts.

20. The method of claim 19, wherein the transmitting step comprises transmitting signals on an FM broadcast channel within the FM band and wherein the simultaneously receiving step comprises simultaneously receiving signals on an FM broadcast channel within the FM band.

21. The method of claim 15, wherein the receiving step comprises receiving radio data system (RDS) information signals.

22. The method of claim 15, wherein the receiving step comprises receiving one or more weather band (WB) channels.

23. The method of claim 15, wherein the second frequency range overlaps the first frequency range, and further comprising utilizing the receiving step to gather information about the first frequency range including signal quality of channels within the first frequency range.

24. The method of claim 15, further comprising resonating the transmit antenna for the transmitting step and resonating the receive antenna for the simultaneously receiving step.

25. The method of claim 15, further comprising using the first module to transmit audio information and using the second module to receive traffic information.

* * * * *

UNITED STATES PATENT AND TRADEMARK OFFICE
CERTIFICATE OF CORRECTION

PATENT NO. : 7,941,194 B2
APPLICATION NO. : 11/985640
DATED : May 10, 2011
INVENTOR(S) : Ganwani et al.

Page 1 of 1

It is certified that error appears in the above-identified patent and that said Letters Patent is hereby corrected as shown below:

In claim 21, column 12, line 2, delete "receivingradio" and insert --receiving radio--.

Signed and Sealed this
Twelfth Day of July, 2011

David J. Kappos
*Director of the United States Patent and Trademark Office*